(No Model.)  3 Sheets—Sheet 2.
C. E. WHITE.
CORN PLANTER.
No. 557,739.  Patented Apr. 7, 1896.
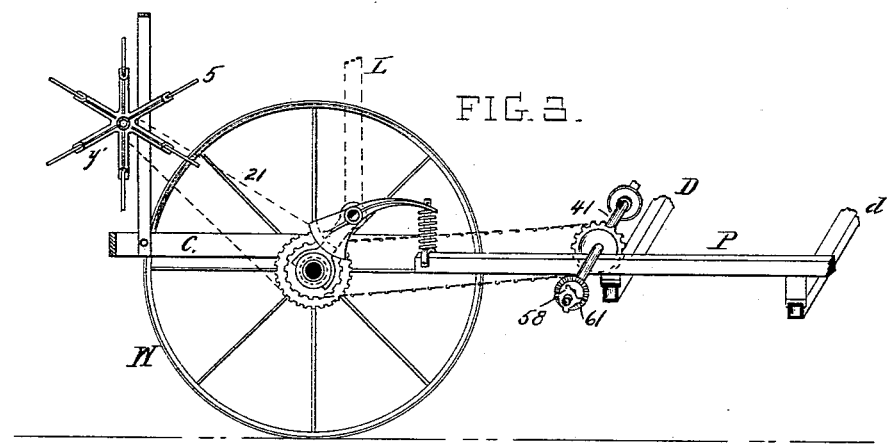
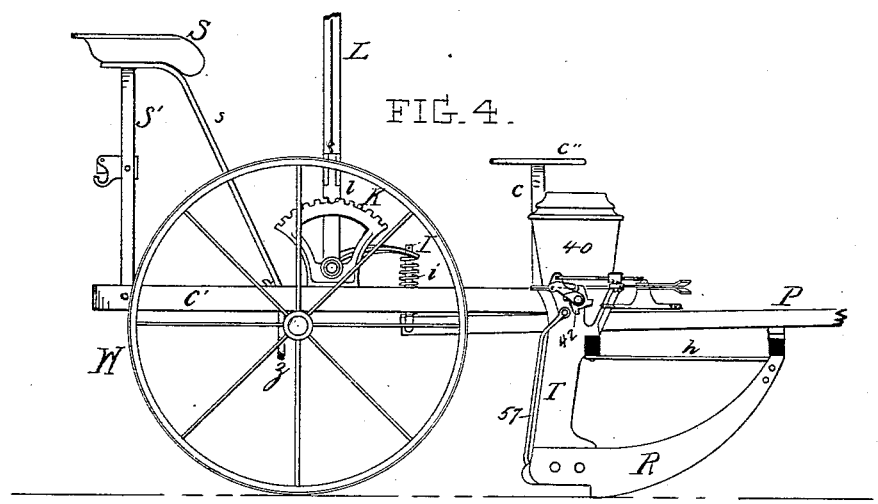
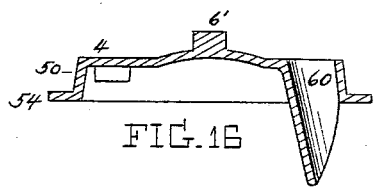
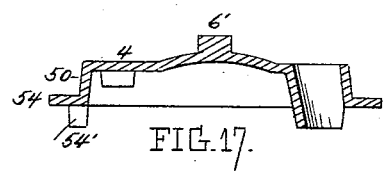
WITNESSES.
A. H. McCoy
L. A. White
INVENTOR.
Charles E. White
by Harold A. Weld
atty.

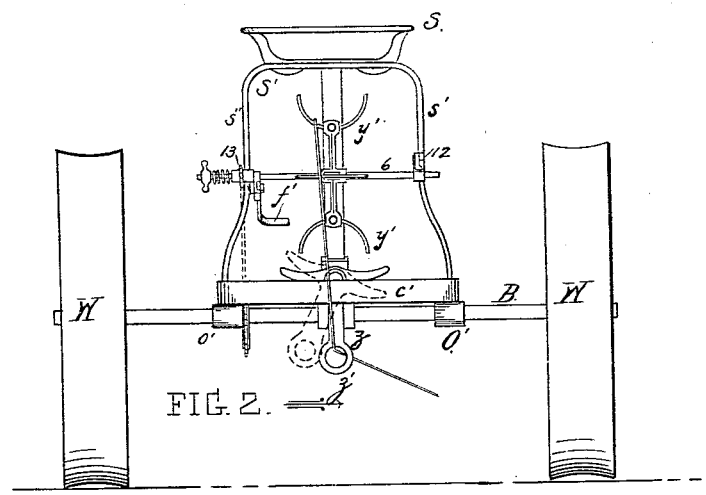

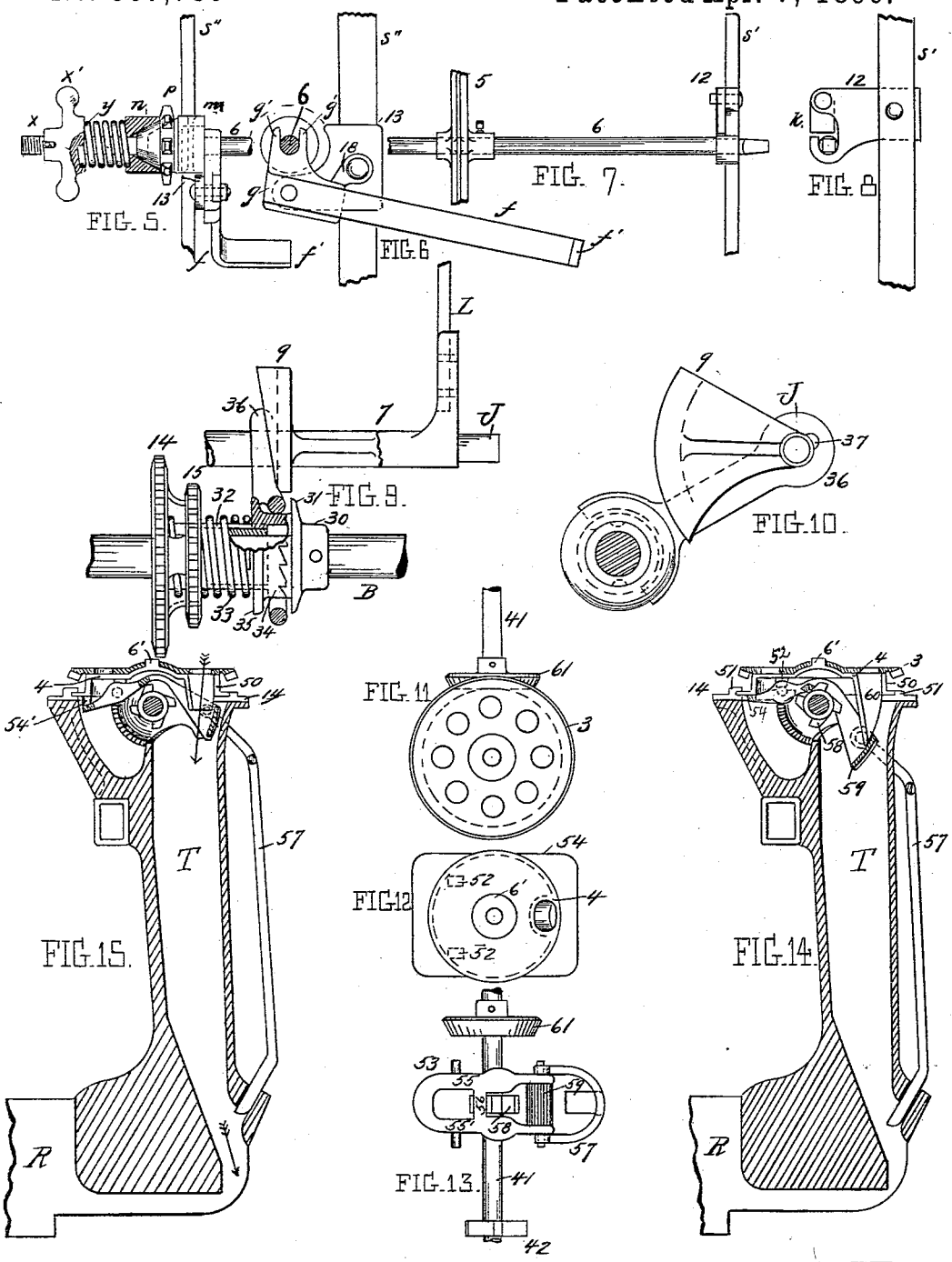

UNITED STATES PATENT OFFICE.

CHARLES E. WHITE, OF MONMOUTH, ILLINOIS, ASSIGNOR TO THE WEIR PLOW COMPANY, OF SAME PLACE.

CORN-PLANTER.

SPECIFICATION forming part of Letters Patent No. 557,739, dated April 7, 1896.

Application filed February 1, 1895. Serial No. 537,007. (No model.)

*To all whom it may concern:*

Be it known that I, CHARLES E. WHITE, a citizen of the United States, residing at Monmouth, in the county of Warren and State of Illinois, have invented certain new and useful Improvements in Corn-Planters, of which the following is a specification.

My invention relates to that class of corn-planters which are provided with an apparatus for check-rowing the seed, and its object is, first, to provide an automatic reel for winding up the check-line from the ground, for unwinding the same, and for carrying the same when not in use; second, to provide a new and improved apparatus for drilling the seed into the earth when it is not desired to check-row the same; third, to combine therewith certain other novel improvements hereinafter set forth. I attain these objects by means of the mechanism described and set forth in the following specification and claims.

In the drawings accompanying and forming a part of this specification, wherein the same character of reference refers to the same part in the several views, Figure 1 is a plan of a corn-planter equipped with my automatic reel. Fig. 2 is a rear view of the same without the seeding mechanism, showing the reel in position. Fig. 3 is a longitudinal cross-section and perspective view of the same with the seed-boxes and check-rowing mechanism removed, showing the method of actuating the seeder-shaft in drilling. Fig. 4 is a side elevation of the same with the reel removed. Fig. 5 is a detail view showing the friction-clutch for driving the reel. Figs. 6, 7, and 8 are details illustrating the supports for the reel-shaft. Figs. 9 and 10 are detail views of the clutch and operating mechanism therefor for connecting and disconnecting the seeder-disks with the wheel-shaft. Figs. 11, 12, 13, and 14 are detail views of the seeder mechanism. Fig. 15 is a view of a modified form of seeder mechanism. Fig. 16 is a detail of a plate shown in Fig. 14, and Fig. 17 is a detail view of the plate shown in Fig. 15.

F is a framework consisting of parallel bars C and C', which are respectively pivoted to the lugs of the brackets $b\,b$, and which extend backward, rest upon the axle, and are united at the rear end by the end piece $c'$, made integral with them. The frame F is preferably made of a single piece of metal bent into the form shown.

P is the pole, upon the rear portion of which cross-bars D and $d$ are bolted or otherwise firmly secured. The runners R R extend downward and backward from each end of the cross-bar $d$, being widened at the rear and adapted to run in the earth and make a furrow for the reception of seed. Seed-tubes T T rise from the heels of the runners and are secured to the cross-bar D.

Brackets $b\,b$, with lugs extending backward, are bolted upon the cross-bar D. One of the wheels W W is attached solidly to the end of the main shaft B, which rotates with it. The other revolves independent of the shaft.

The pole P extends backward beyond the cross-bar D for a convenient distance and bears a pin I extending upward at its rear end. The dropper-seat $c''$ is mounted above the pole near its rear end upon the standard $c$ rising from the bars C and C' near their front ends.

The pin I is encircled by the coil-spring $i$. The rocker-bar J is mounted on standards $o$ and O on the side pieces C and C', respectively, and bears the arm $j$, which extends upward and forward and is provided with a slot in its end which fits over the pin I so that the arm bears upon the spring $i$ and presses it downward when the lever L, which rotates the rocker-bar, is thrown forward. The standards O and $o$ are extended downward and backward and form journal-boxes O' and $o'$, in which is journaled the main shaft of the planter. The journal-box $o'$ also forms a stop for the sleeve 32, as hereinafter set forth.

The lever L, and thereby the rocker-bar, is held firmly in position by means of the dog $l$ upon the lever L, which engages the toothed segment K. The dog is pressed downward by a spring and raised by a finger-bar in the usual manner. Rotating the rocker-bar forward by means of the lever L presses the rear end of the pole and thereby the heels of the runners downward, and the seed is planted deeper. The reverse motion of the rocker-bar elevates the heels by raising the rear end of the pole. I adjust the lever and arm upon the rocker-bar so that when the lever L is in a vertical position the heels are elevated so as to drop the corn at the least depth ever desirable.

Hounds $h$ $h$ extend from the cross-bar $d$ on either side of the pole to the respective ends of the cross-bar D. The seat S is borne upon the arched top of the standard S', whose right and left legs $s'$ and $s''$ are respectively bolted to the bars C' and C near their rear ends. The seat is braced by the arm $s$ bolted beneath it and extending forward and downward to the axle B and there journaled.

The automatic reel is borne between the legs $s'$ and $s''$ of the standard S' immediately beneath the seat S upon the revolving reel-shaft 6. Upon the leg $s'$ is borne the bracket 12, Fig. 8, extending backward and being provided with a recess in its rear portion, the lower part of which is circular on its inner surface and adapted to form a bearing for the reel-shaft 6 to revolve upon. The gravity-stop $k$, swinging forward and backward on a pivot on the bracket directly above the bearing of the reel-shaft, prevents the dislodgment of the reel-shaft from its bearings. Upon the leg $s''$ is the bracket 13, the lower portion of which is extended backward, and the front lever $f$ is pivoted upon it at its rear end and extends forward, and its forward end is turned inward so as to make a pedal $f$. Upon the rear end of the foot-lever $f$ is bolted the bracket $g$, which extends upward and is bifurcated into jaws $g'$ $g'$, between which the reel-shaft rests. The reel-shaft bears the cylinder $m$, keyed firmly upon it immediately outward beyond the point where it rests between the jaws $g'$ $g'$. The outer end of the cylinder $m$ tapers off in the shape of the frustum of a cone. Beyond the cylinder $m$ the shaft bears the cylinder $n$, turning freely upon the shaft, bearing the sprocket-wheel $p$ on its inner end provided with a cone-shaped recess fitting over the conical outer end of the cylinder $m$ and forming a friction-clutch. The reel-shaft terminates in the screw $x$, upon which turns the hand-screw $x'$. Between the hand-screw $x'$ and the cylinder $n$ is interposed the coil-spring $y$, encircling the reel-shaft. When by means of the hand-screw and spring the cylinders $m$ and $n$ are forced together, the friction-clutch operates and the shaft and reel revolve.

The pressure of the hand-screw $x'$ upon the spring $y$ is regulated so as to cause the reel to wind or unwind the check-line tightly, but to permit the friction-clutch to slip whenever the strain becomes so great as to be likely to break the check-line.

The stop 18, pivoted upon the bracket 13, prevents the front end of the foot-lever $f$ from flying up and the jaws $g'$ $g'$ from moving backward and allowing the reel-shaft to be displaced. Downward pressure on the pedal $f'$ causes it to act as a brake upon the reel-shaft, and forces the cylinder $m$ against its bearing in the bracket 13, causing greater friction and having the same tendency to cause slip on the friction-clutch as is produced by diminishing the pressure of the hand-screw and spring upon it. The operator thus has a double means of regulating the tension of the check-line in winding or unwinding the same.

The reel 5 is keyed upon the reel-shaft 6, near its center, and consists of radiating spokes $y'$ $y'$, forked at their outer ends so as to operate as a spool. Beneath the lower end of the brace $s$ is pivoted a T-shaped arm $z$, which extends downward and bears at its lower end an eye $z'$, through which is threaded the check-line, as shown in Fig. 2. The upper transverse portion of the arm $z$ projects on either side of the standard $s$ so that the operator can move the arm on its pivot by foot-pressure, and the eye being moved thereby from side to side distributes the check-line evenly upon the reel as it is wound up. The reel-shaft is actuated by the main shaft B, which communicates motion by means of the sprocket-wheel $l$ and the drive-chain 21 to the sprocket-wheel $p$.

Upon the main shaft B is pinned the sleeve 30, which encircles the shaft and revolves with it. Near one end it bears the flange 31 with clutch-teeth. (See Fig. 9.) The sleeve 32 fits over the axle and is free to revolve upon it, but not to move in the direction of the axis of the shaft, being interposed between the journal-box $o'$ and the sleeve 30, which limit its motion. The sleeve 32 bears on the end farthest from the clutch the sprocket-wheels 14 and 15, and is encircled by the coil-spring 33. The collar 34, bearing a circular flange 35, fits over and is splined upon the end of the sleeve 32 nearest the clutch-teeth to engage those of the flange 31, and is forced against the flange 31 so as to engage its clutch-teeth by the coil-spring 33. The rocker-bar J bears a wing 9 (see Fig. 10) in the shape of the segment of a circle. The rocker-bar J also bears on its side opposite the wing 9 two lugs or lips 37 37. The arm 36 which disengages the clutch 35 has an eye at one end large enough to enable it to fit over the rocker-bar J, which eye is grooved on its rear surface so that the arm when turned forward will slip over the lugs 37, but when turned backward in its position for use the groove is thrown to the rear of the lugs and the arm is held between them. The rear extremity of the arm 36 is forked so as to half encircle the sleeve 34.

The face of the segment 9 bears on the arm 36, which is held loosely between the lugs 37 37. The face of the segment 9 bearing on the arm 36 is wedge-shaped, so that when the lever L is thrown backward the wedge-face of the segment 9 forces the rear extremity of the arm 36 outward against the coil-spring 33 and disengages the clutch, as shown in Fig. 1. The wing 9 is so placed upon the rocker-bar that when the lever L is in a vertical position the wedge-face of the segment 9 and the arm 36 are in juxtaposition, but the segment 9 is exerting no pressure on the arm 36. The arm J is then in such a position that the heels of the runners R are raised so far out of the ground as to plant the seed as shallow as possible. It never being desired to plant the seed when the sprocket-wheels 14 and 15 are out of gear, the backward motion of the lever L, which throws them out of gear and at the same time raises the heels of the runners, does not interfere with the operation of planting. I provide a crank $k$, which may be adjusted upon the end of the reel-shaft opposite to that bearing the sprocket-wheel, for use in winding up the check-line by hand when desired.

When it is desired to make use of a planter equipped with my automatic reel, the check-line may be laid in the field in the following manner: The end of the line, which is wound upon the reel, having been secured to a peg in the usual manner the drive-chain 21 may or may not be removed, as preferred, the planter is driven along one side of the field, and the line unwinds itself from the reel. The tension at which the line is laid is regulated by the hand-screw $x'$ or the foot-lever $f$, or by both operating conjointly. When the check-line has been laid, the reel may be removed, if desired. When it is desired to wind the line up again, the reel-shaft is adjusted in its bearings, and the drive-chain 21 being in place the end of the check-line is passed through the eye $z'$ of the arm $z$ and attached to the reel. The planter is then driven over the line, straddling it. The reel winds up the line as the planter moves forward, the operator distributing the line evenly upon the reel by means of the arm $z$. The tension of the line upon the reel is regulated by the hand-screw $x'$ and the foot-lever $f$.

I will now describe my improvement in the seeding apparatus of the corn-planter which I have embodied in my improved corn-planter. The seed-boxes 40 40 are sustained upon the seed-tube T T, which are braced and strengthened by the cross-bar D. The operating-shaft 41 extends parallel to the cross-bar D to and through the upper part of each of the seed-tubes and projects beyond them, bearing at its extremities the ratchet-wheels 42 42. Projecting brackets 43 43 sustain the guide-wheels 44 44, over which passes the check-line. Levers 45 45 are fulcrumed on the rear of the brackets 43 43 and are held by springs 46 46, so that their outer forked ends are held near the forward guide-wheels in the position shown in Fig. 1, so that the balls or knobs on the check-line engaging the forked end of the lever throw it backward until it is in such a position that the knobs or balls disengage themselves as the machine moves forward. The rear ends of the levers operate pawls 48 48, actuating the ratchet-wheels 42 42. As the outer end of the lever is thrown backward, the inner end, which holds the pawl 48, moves forward and the pawl, engaging one of the teeth of the ratchet-wheel 42, causes the operating-shaft to move through a part of one revolution. When the lever 45 is disengaged from the knob, the spring 46 moves the lever and pawl back to their former positions.

The seed-box is closed at the bottom by the dropper-plate 3, which is perforated with circular holes near its circumference. The dropper-plate rests and is pivoted at its center upon the center plate 4, (see Figs. 12, 14, 15, and 16,) which is a circular plate upheld on a circular standard 50 and has at its center a raised boss 6', upon and over which sets the dropper-plate 3. The seed-pocket 60 extends downward from the rear of the center plate, being open at the top and also at the rear, below the plate. As the dropper-plate revolves in the seed-box, its perforations become filled with seed and a stationary cover-plate (not shown in the drawings, but similar in all respects to those ordinarily used in planters of this class) covers that portion of the dropper-plate above the seed-pocket 60. As the dropper-plate revolves, the perforations or seed-cells pass successively under the cover-plate and discharge their seed into the seed-pocket. The horizontal flange 54 projects to front and rear from the bottom of the standard 50, fits under the lips 51 on the square bottom plate 14, and is held firmly in place thereby. Beneath the center plate, toward the front, lugs 52 52 project downward and on them is pivoted the valve-lifter 53. (See Figs. 12, 13, and 14.) The front end of the valve-lifter rests beneath the flange 54. From the front the valve-lifter extends upward and backward in the form of two parallel bars 55 and 55', which are joined by the cross-piece 56 just in front of the operating-shaft. Thence it extends backward and downward and to its lower rear portion is pivoted on each side the valve 57, which is forked in its upper portion, extending around on the outside of the seed-tubes to the pivots on the valve-lifter and also extending downward in the rear of the seed-tube on the outside, to a point immediately above the heel of the runner, and thence is bent slightly forward, passing through an inclined slot in the rear of the seed-tube, so that when the valve-lifter is down the valve effectually closes the lower portion of the seed-tube and prevents the escape of seed. On the operating-shaft, immediately beneath the cross-bar 56 of the valve-lifter, is borne a wheel 58, with peripheral projections inclining backward, so that as the wheel is turned forward with the operating-shaft the projections on the wheel 58 successively present inclined surfaces to the cross-bar 56, and by exerting pressure upon it raise the valve and valve-lifter 59. Between the two arms 55 and 55' of the valve-lifter, at their rear extremity, is carried an inclined plate 59. The lower opening of the seed-pocket 60, extending downward from the center plate 4, opens to the rear and the plate 59 is so adjusted with reference to it that when the valve-lifter is raised the plate 59 moves upward and closes the lower opening of the pocket 60. The operating-shaft 41 bears a bevel cog-wheel 61, and the dropper-plate 3 has a corresponding bevel on its outer circumference, with cogs meshing with those of the bevel-wheel. The operation of this device is obvious.

When the knob on the check-line engages the forked end of the lever 45 and moves it backward, the pawl on the other end of the lever acting upon the ratchet-wheel 42 actuates the operating-shaft and causes it to perform a part of one revolution. As the operating-shaft revolves, the wheel 58 raises the valve-lifter 53, which in turn lifts the valve 57 and allows the seed to drop into the earth. At the same time the plate 59, moving upward, closes the lower opening of the pocket 60, and the dropper-plate actuated by the bevel-wheel 61 is moved so as to bring one of the holes in the dropper-plate above the pocket 60, allowing the grains of seed to drop into the pocket 60, where they are retained by the plate 59. When the operating-shaft has revolved so far as to allow the projection on the wheel 58 to pass from under the cross-bar 56, the knob on the check-line disengages itself from the lever 45 and the rotation of the operating-shaft stops, the valve-lifter falls back to its original position, the valve is lowered, closing the seed-tube at the bottom, and the seed which has been confined in the pocket 60 is released as the plate 59 moves from before its lower opening and is confined by the valve 57 at the lower end of the seed-tube, ready to be dropped into the earth when the valve 57 is lifted again. This is the normal operation of the machine in check-rowing the seed. For the purpose of drilling the seed I cut off the lower portion of the pocket 60 (see Figs. 15 and 17) and provide the front portion of the flange 54 on the center plate with a lug or spur 54', projecting downward and adapted to bear upon the front end of the valve-lifter in front of the pivot upon which it works, so as to hold up the valve-lifter and also the valve in the position shown in Fig. 15. Sprocket-wheels 65 and 66 are borne on the operating-shaft immediately in front of the sprocket-wheels 14 and 15 upon the main shaft B. For drilling I dispense with the check-line, and by means of a drive-chain I actuate the operating-shaft directly from the main shaft. The sprocket-wheels 65 and 66' on the operating-shaft are of different diameters, as it may be desired to regulate the speed at which the operating-shaft revolves. The dropper-plate by this arrangement rotates continuously, and the seed passes in the direction indicated by the arrows shown in Fig. 15 without stop from the seed-boxes to the earth.

Having thus described my invention, what I claim as new, and desire to secure by Letters Patent, is—

1. In a check-row corn-planter, a reel-shaft and reel carried thereby, a cylinder secured to said shaft having a tapered end, a sleeve loose on the shaft, having a recessed face to correspond to said tapered end, a spring encircling the shaft and bearing against the sleeve, a hand-wheel for regulating the tension of the spring, a sprocket-wheel on said sleeve, and connections from said sprocket-wheel to the driving-axle, substantially as described.

2. In a check-row corn-planter, in combination with the machine-frame, the bearing-brackets, the lever pivoted to one of said brackets, having an upturned forked end, the reel-shaft having one end seated in said forked end and the other end seated in the other bracket, the other end of said lever being provided with a treadle whereby it may be depressed to force the shaft against the bearing-bracket, substantially as described.

3. In a corn-planter an axle B revolving with one of the wheels, a sleeve 30 revolving with the shaft bearing a flange 31 with clutch-teeth, a sleeve 32 revolving independent of the shaft, a collar 34 fitting over and splined upon sleeve 32 having clutch-teeth to engage flange 31, a rocker-bar J bearing a wing 9 with a wedge-face and holding loosely an arm 36 actuating the collar 34 in such position that rotating said rocker-bar backward causes said wedge-face on the wing 9 to actuate the arm 36 and cause it to release the clutch, a coil-spring 33 encircling the sleeve 32 and tending to force the collar 34 in against the flange 31 and a lever L with toothed segment, dog and finger-bar for rotating said rocker-bar as described.

4. In combination with the operating-shaft, with means for driving it, the seed-boxes, seed-tubes for conveying the seed to the earth, the center-plates at the upper end of said tubes, the seed-pockets carried by said plates arranged to communicate with the seed-tubes, the perforated dropper-plate revolving upon said center-plate, the valve closing the lower end of the pocket, and means for operating it as the shaft revolves, substantially as described.

5. In combination with the operating-shaft, the center-plate, the dropper-plate pivoted thereon and driven from the operating-shaft, the seed-pocket depending from the center-plate and having a rearwardly-opening curved face, the valve-lifter pivotally supported beneath the center-plate and carrying a valve arranged to close the mouth of the seed-pocket, and the wheel 58 carrying projections arranged to operate the valve-lifter, substantially as described.

6. In combination with the operating-shaft, the seed-boxes, the seed-tubes, the center-plates at the upper end of said tubes having pockets, the perforated dropper-plates revolving upon the center-plates, the valves closing the lower ends of the pockets with means for operating them, and the supplemental valve arranged to close the lower end of the seed-tube and connected to the upper valve, substantially as described.

7. In combination with the operating-shaft, seed-boxes and seed-tubes, the removable and interchangeable center-plates, the dropper-plates journaled on the center-plates and the valves pivoted beneath the center-plates, substantially as described.

CHARLES E. WHITE.

Witnesses:
 HAROLD A. WELD,
 W. H. SEXTON.